(12) United States Patent
Jian

(10) Patent No.: US 8,514,275 B2
(45) Date of Patent: Aug. 20, 2013

(54) THREE-DIMENSIONAL (3D) DISPLAY METHOD AND SYSTEM

(75) Inventor: Peiyun Jian, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 380 days.

(21) Appl. No.: 12/982,550

(22) Filed: Dec. 30, 2010

(65) Prior Publication Data

US 2012/0019635 A1 Jan. 26, 2012

(51) Int. Cl.
*H04N 15/00* (2006.01)

(52) U.S. Cl.
USPC .......................................................... 348/54

(58) Field of Classification Search
None
See application file for complete search history.

(56) References Cited

U.S. PATENT DOCUMENTS

| | | | |
|---|---|---|---|
| 5,710,875 A * | 1/1998 | Harashima et al. ............ | 345/419 |
| 2002/0024592 A1 * | 2/2002 | Uomori et al. .................. | 348/42 |
| 2004/0247175 A1 * | 12/2004 | Takano et al. .................. | 382/154 |
| 2010/0156907 A1 * | 6/2010 | Vanderspek et al. .......... | 345/427 |
| 2010/0303442 A1 * | 12/2010 | Newton et al. ................. | 386/241 |
| 2011/0194756 A1 * | 8/2011 | Morifuji et al. ................ | 382/154 |

\* cited by examiner

*Primary Examiner* — Christopher S Kelley
*Assistant Examiner* — Zhen Jessica Li
(74) *Attorney, Agent, or Firm* — Anova Law Group, PLLC

(57) ABSTRACT

A method is provided for a three-dimensional (3D) display system. The method includes obtaining a plurality of original images of a plurality of viewpoints in a 3D image for display, and adjusting an average parallax value between at least two of the plurality of original images based on a current size of a display window on a display device configured to display the 3D image. The method also includes reconstructing 3D scene information of the 3D image, and obtaining an image for each of the plurality of viewpoints and at least one new viewpoint based on the reconstructed 3D scene information. Further, the method includes combining the image of each viewpoint into a new 3D image with a desired average parallax, and sending the new 3D image to the display device for 3D display.

20 Claims, 9 Drawing Sheets

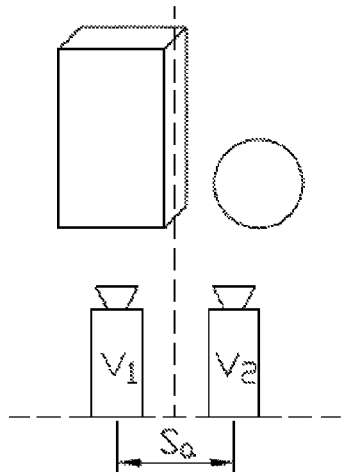
FIG. 10A
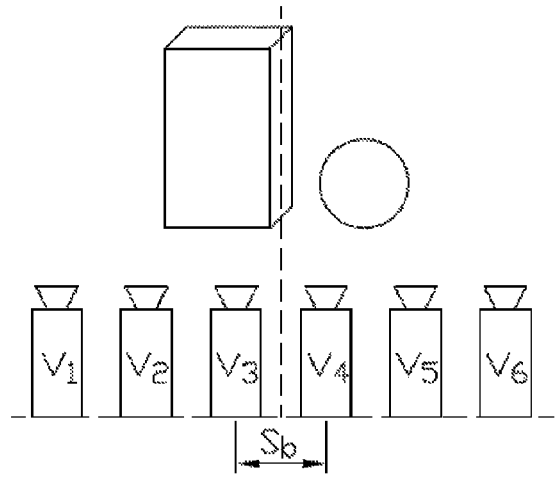
FIG. 10B
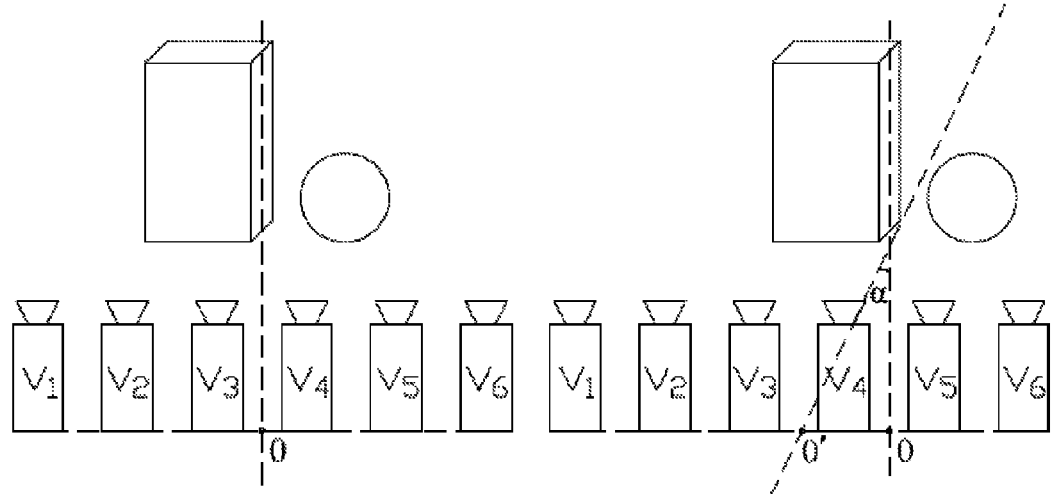
FIG. 11A  FIG. 11B

THREE-DIMENSIONAL (3D) DISPLAY METHOD AND SYSTEM

CROSS-REFERENCES TO RELATED APPLICATIONS

This application claims the priority of Chinese patent application no. 201010244525.1 filed on Jul. 23, 2010, Chinese patent application no. 201010244533.6 filed Jul. 23, 2010, and Chinese patent application no. 201010235272.1 filed Jul. 23, 2010, the entire contents of all of which are incorporated herein by reference.

FIELD OF THE INVENTION

The present invention relates to three-dimensional (3D) display technologies and, more particularly, to the methods and systems for stereoscopic 3D display.

BACKGROUND

Three-dimensional (3D) display devices often simultaneously display two sets of images with a certain parallax between them on a display screen, so that a user can watch the two sets of images through the left eye and the right eye respectively to perceive 3D images.

Current 3D display technologies require a 3D video source to include multiple sets of images with parallax. 3D video sources may be structurally divided into 3 different types: multi-view, 2D plus depth, and stereo. The three types of video source formats may correspond to different 3D display technologies. For example, autostereoscopic display technology and stereoscopic display technology require different 3D video source formats, meaning that the specific types of 3D video source formats require specific 3D display devices in order to display 3D images. That is, 3D video sources are often not compatible on different 3D display devices.

In addition, existing 3D display technologies may be unable to solve the problem of an undesired parallax causing poor viewing experience of a viewer. Currently, various sets of images in a 3D video source are often captured with a fixed angle, and the 3D video source is recorded, transmitted, and displayed with fixed frames. Therefore, when a 3D image is displayed on a 3D display screen, the parallax among the various sets of images of the 3D image is also fixed. Further, a viewer may adjust the size of the 3D display screen during displaying, such as adjusting the size of a video playback window on a computer screen, which may result in changes in the parallax among the different sets of images displayed on the screen. When the parallax exceeds a certain level, the viewer may experience undesired image quality, such as ghosting.

The disclosed methods and systems are directed to solve one or more problems set forth above and other problems.

BRIEF SUMMARY OF THE DISCLOSURE

One aspect of the present disclosure includes a method for a three-dimensional (3D) display system. The method includes obtaining a plurality of original images of a plurality of viewpoints in a 3D image for display, and adjusting an average parallax value between at least two of the plurality of original images based on a current size of a display window on a display device configured to display the 3D image. The method also includes reconstructing 3D scene information of the 3D image, and obtaining an image for each of the plurality of viewpoints and at least one new viewpoint based on the reconstructed 3D scene information. Further, the method includes combining the image of each viewpoint into a new 3D image with a desired average parallax, and sending the new 3D image to the display device for 3D display.

Another aspect of the present disclosure includes a 3D display system. The 3D display system includes a display device and a processor. The display device includes a display window for displaying images. The processor is configured to obtain a plurality of original images of a plurality of viewpoints in a 3D image for display, and to adjust an average parallax value between at least two of the plurality of original images based on a current size of the display window. The processor is also configured to reconstruct 3D scene information of the 3D image, and to obtain an image for each of the plurality of viewpoints and at least one new viewpoint based on the reconstructed 3D scene information. Further, the processor is configured to combine the image of each viewpoint into a new 3D image with a desired average parallax, and to send the new 3D image to the display device for 3D display.

Another aspect of the present disclosure includes a computer readable medium containing executable computer instructions for performing a method for a 3D display system. The method includes obtaining a plurality of original images of a plurality of viewpoints in a 3D image for display, and adjusting an average parallax value between at least two of the plurality of original images based on a current size of a display window on a display device configured to display the 3D image. The method also includes reconstructing 3D scene information of the 3D image, and obtaining an image for each of the plurality of viewpoints and at least one new viewpoint based on the reconstructed 3D scene information. Further, the method includes combining the image of each viewpoint into a new 3D image with a desired average parallax, and sending the new 3D image to the display device for 3D display Other aspects of the present disclosure can be understood by those skilled in the art in light of the description, the claims, and the drawings of the present disclosure.

BRIEF DESCRIPTION OF THE DRAWINGS

FIG. 10A illustrates certain original viewpoints consistent with the disclosed embodiments;

FIG. 10B illustrates an exemplary new viewpoints generation consistent with the disclosed embodiments;

FIG. 11A illustrates certain viewpoints consistent with the disclosed embodiments;

FIG. 11B illustrates an exemplary new viewpoints generation consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
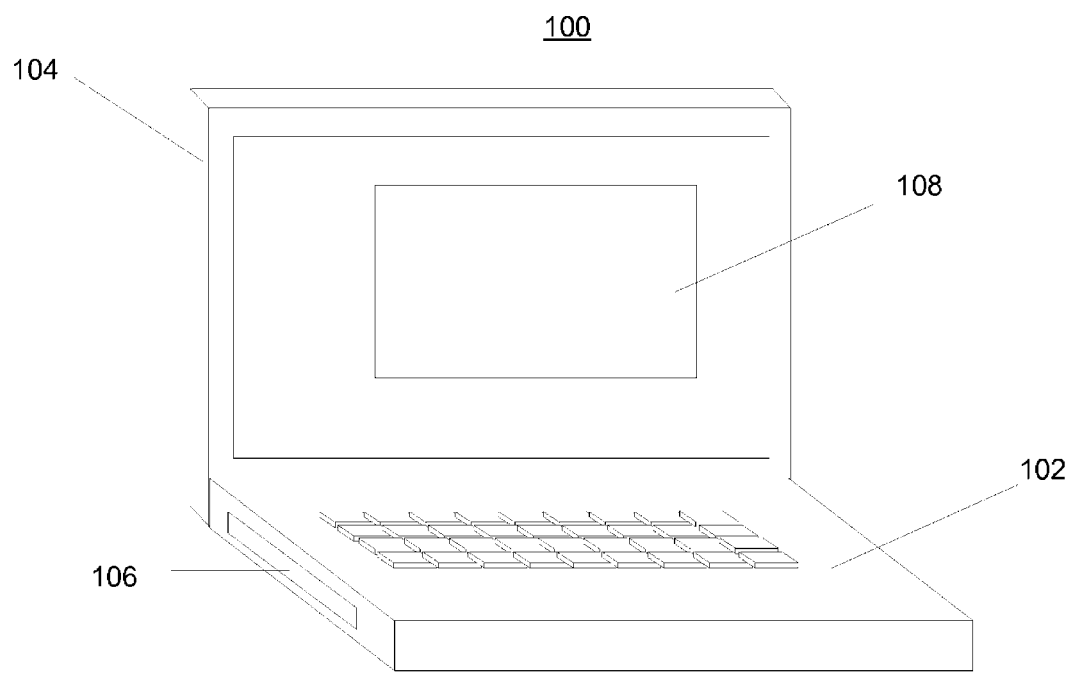
FIG. 1 shows an exemplary environment incorporating certain aspects of the invention.

FIG. 1 shows an exemplary environment incorporating certain aspects of the invention. As shown in FIG. 1, a three-dimensional (3D) display system 100 may include a base 102, a 3D display screen 104, and a 3D video source 106. 3D display system 100 may include any appropriate device that capable of processing and displaying 3D images, such as a computer, a television set, a smart phone, or a consumer electronic device. Although 3D display system 100 is shown as a notebook computer, any device with computing power may be included.

Base 102 may include any appropriate structures and components to support operations of 3D display system 100. 3D display screen 104 may include any appropriate display screen based on plasma display panel (PDP) display, cathode ray tube (CRT) display, liquid crystal display (LCD), organic light emitting diode (OLED) display, or other types of displays. 3D display screen 104 may also include any appropriate optical devices such as a lenticular lens screen or parallax barrier to facilitate 3D displays.

Further, 3D video source 106 may include any appropriate sources of 3D video and pictures, such as a DVD or CDROM device, a set top box, a digital receiver, a network adapter, a TV tuner, an information storage device, or other media players. A window 108 may be opened on display screen 104 during operation of 3D display system 100 to display 3D images.

Figure 2:
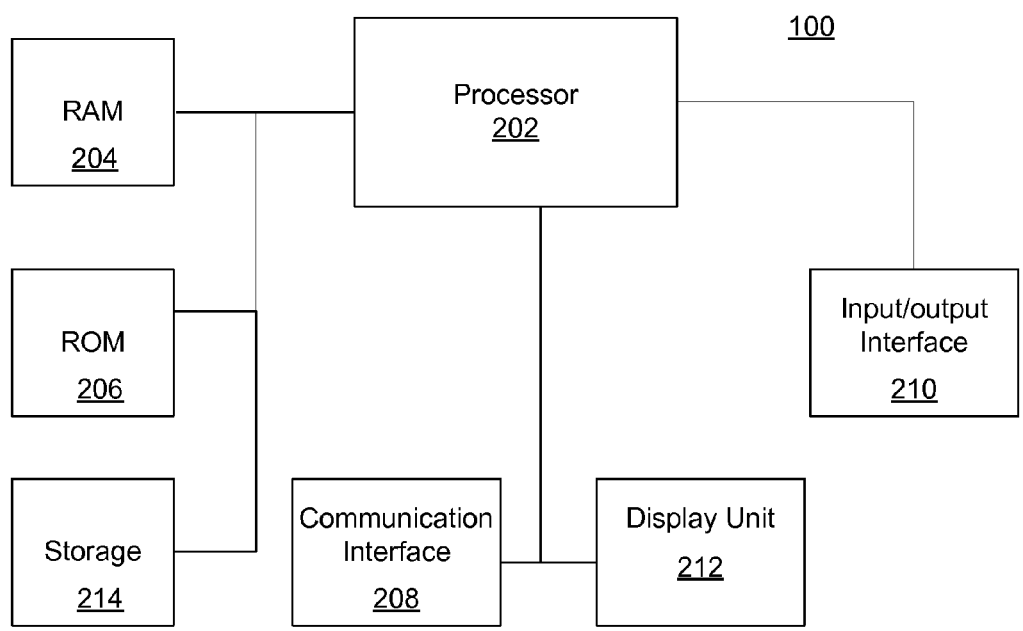
FIG. 2 illustrates a functional block diagram of a 3D display system consistent with the disclosed embodiments.

FIG. 2 illustrates a functional block diagram of 3D display system 100. As shown in FIG. 2, 3D display system 100 may include a processor 202, a random access memory (RAM) unit 204, a read-only memory (ROM) unit 206, a communication interface 208, an input/output interface unit 210, a display unit 212, and a storage unit 214. Other components may be added and certain devices may be removed without departing from the principles of the disclosed embodiments.

Processor 202 may include any appropriate type of graphic processing unit (GPU), general purpose microprocessor, digital signal processor (DSP) or microcontroller, and application specific integrated circuit (ASIC). Processor 202 may execute sequences of computer program instructions to perform various processes associated with system 100. The computer program instructions may be loaded into RAM 204 for execution by processor 202 from read-only memory 206.

Communication interface 208 may provide communication connections such that system 100 may be accessed remotely and/or communicate with other systems through computer networks or other communication networks via various communication protocols, such as transmission control protocol/internet protocol (TCP/IP), hyper text transfer protocol (HTTP), etc.

Input/output interface 210 may be provided for users to input information into system 100 or for the users to receive information from system 100. For example, input/output interface 210 may include any appropriate input device, such as a remote control, a keyboard, a mouse, an electronic tablet, voice communication devices, or any other optical or wireless input devices. Display unit 212 may include any appropriate display screen such as display screen 104. Further, storage unit 214 may include any appropriate type of storage medium, such as a CD-ROM, a hard disk, a flash drive, an optical storage, a DVD drive, or other type of storage devices.

Figure 3:
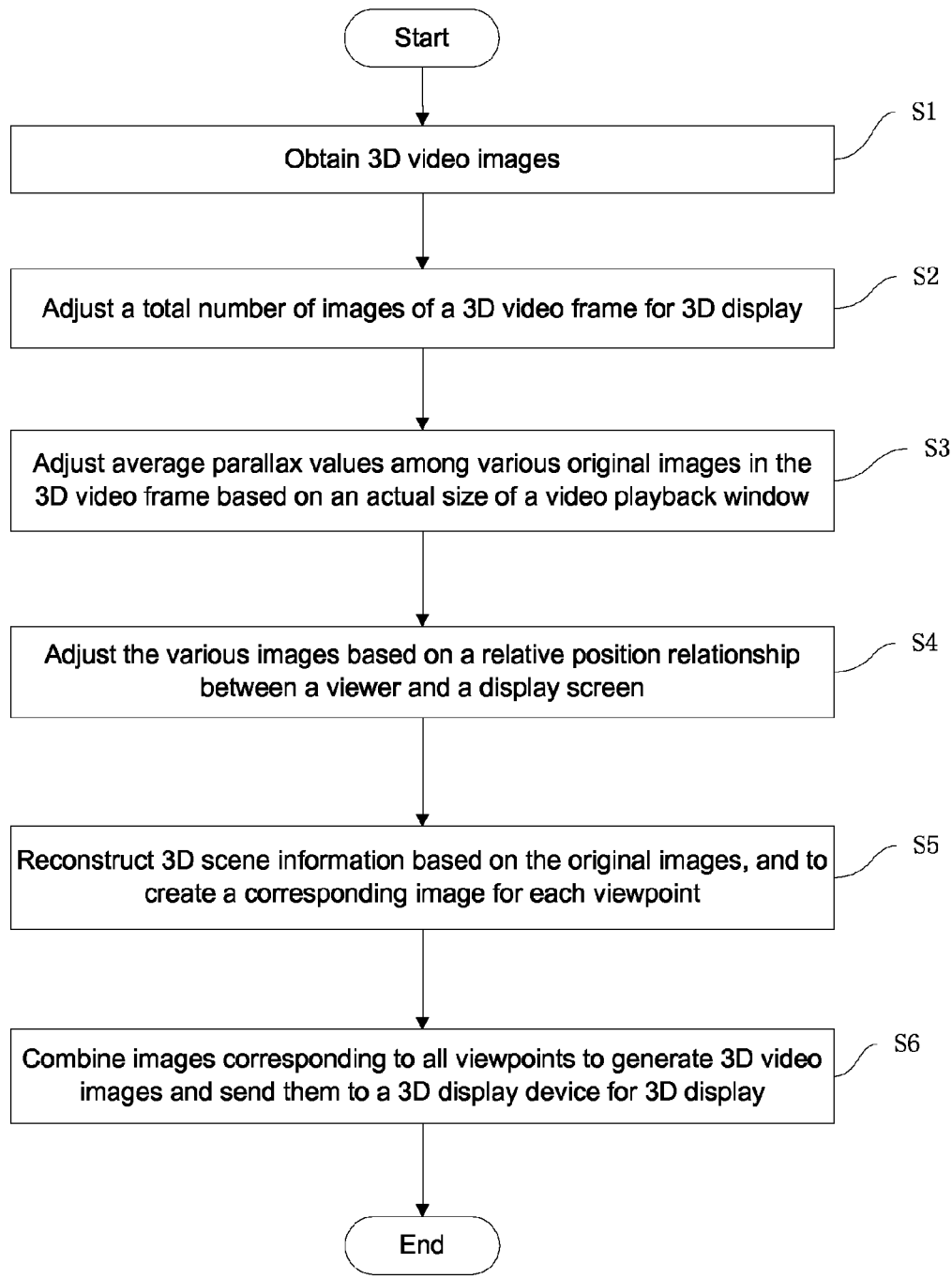
FIG. 3 illustrates an exemplary operational process consistent with the disclosed embodiments.

During operation of system 100, processor 202 may perform certain processes to display 3D images to one or more users. FIG. 3 shows an exemplary operational process performed by processor 202 (or by 3D display system 100). As shown in FIG. 3, at the beginning, processor 202 may obtain 3D images (S1). Processor 202 may obtain 3D images from 3D video source 106. The 3D images may include at least two sets of images used for 3D display. The 3D video may be in a stereo format, which means a 3D image includes two images from two viewpoints, a first image and a second image. For example, the 3D image includes a first image to be viewed by a viewer's left eye (i.e., a left image) and a second image to be viewed by the viewer's right eye (i.e., a right image), with a certain parallax between the left image and the right image.

The 3D video may also be in a multi-view format, which means a 3D image includes multiple images from multiple viewpoints. For example, the 3D image may include first, second, ... and $N^{th}$ images (N is an integer number greater than 2). A certain parallax exists between two neighboring images of the N images to be viewed by a viewer's left and right eyes respectively.

Figure 4:
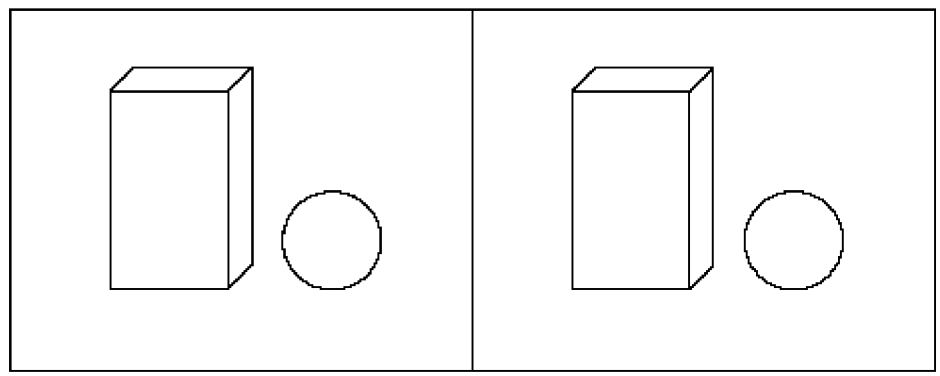
FIG. 4 illustrates show a relationship between a 3D image and images from different viewpoints consistent with the disclosed embodiments.
Figure 5:
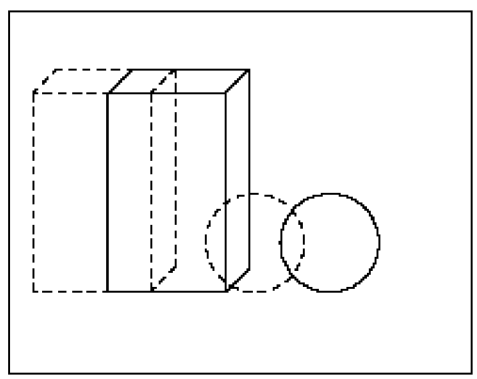
FIG. 5 illustrates show another relationship between a 3D image and images from different viewpoints consistent with the disclosed embodiments.

FIGS. 4 and 5 show a relationship between the 3D image, the first image, and the second image (or any two images with certain parallax). As shown in FIG. 4, the left side picture shows a first image, and the right side picture shows a second image. As shown in FIG. 5, the first image and the second image are overlapped or combined together, which shows a disparity between the first image and the second image, i.e., the parallax. Also, the parallax between the first image and the second image may be fixed during operation.

The 3D video data may be stored and transmitted in a certain video format. Also, the 3D video data may be generated by a video capturing device (such as a camera) in real-time or by certain video authoring software. If a video playback program, such as a video-on-demand system, uses DirectShow framework or other applications for video processing, processor 202 may obtain every video frame in real-time. Each frame contains a 3D image. Processor 202 may also determine a total number of images in a video frame and obtain individual images. For example, if there are two images (a stereo video frame), processor 202 may separate a first image and a second image from the 3D video frame data.

After obtaining the images associated with a 3D video frame (S1), processor 202 may adjust a total number of images for 3D display (S2). For example, processor 202 may first determine a type of 3D display device to be used to display the 3D image, and then determine a desired number of images needed for the particular type of 3D display device.

Different types of 3D display devices may require different video source formats. For example, a stereoscopic display device may require a viewer to wear special glasses when watching the 3D display. With the help of the special glasses, the stereoscopic display device may only need two images for displaying a 3D image. On the other hand, for an autostereoscopic display device, a user may watch the 3D display without wearing any special glasses. The autostereoscopic display device thus may need multi-viewpoint video source format and may require multiple images. For example, in order to achieve a desired 3D image display, the autostereoscopic display device may need 9 images. Also, certain amount of parallax among the 9 images should be within a certain range.

Processor 202 may compare the total number of images required by the particular type of display device with the total number of original images in the 3D video frame. If the two numbers match, no adjustment as to the number of images is needed. On the other hand, if the two numbers do not match, processor 202 may adjust the number of images to match the number as required by the particular display device.

For example, if the number of original images is less than the number required by the particular display device, processor 202 may increase the number of images by adding additional images such that the two numbers match. This may happen when using an autostereoscopic display device to display a 3D image made for a stereoscopic display device requiring glasses, or made for another autostereoscopic display device using less images. On the other hand, if the number of original images is greater than the number required by the particular display device, processor 202 may reduce the number of images by deleting certain images such that the numbers match. This may happen when using a stereoscopic display device to display a 3D image made for an autostereoscopic display device, or when using an autostereoscopic display device to display a 3D image made for another autostereoscopic display device using more images.

More particularly, when deleting images, processor 202 may delete those images appearing at the edges of a display screen or a playback window. When adding images, processor 202 may generate additional number (i.e., the difference between the original number and the total number required by the display device) of auxiliary images using an interpolation method. For example, processor 202 may determine parallax relationships between the original images, and create a matching table among the original images. Further, based the matching table, various auxiliary images may be generated using interpolation.

For example, if the original 3D video frame is in a stereo format and has two images, while the display device is an autostereoscopic display device requires N images, processor 202 may determine to generate N−2 auxiliary images. Further, processor 202 may determine a parallax relationship between the original first image and the original second image, and create a matching table between the first image and the second image. Based the matching table, N−2 auxiliary images may be generated using interpolation such that the N images may be used by the autostereoscopic display device for 3D display.

Further, processor 202 may adjust average parallax values among various original images in the 3D video frame based on an actual size of a video playback window (S3). Certain related principles are explained first.

A 3D display device usually combines various images with parallax using certain pixel arrangement algorithms and sends the combined image directly to a display screen. Such combined image with parallax thus can be viewed by a viewer's left and right eyes to perceive a 3D image. Therefore, different images with different parallax may lead the viewer to experience different 3D effects, and to feel the different images having different depth. When parallax between two or more images of an object displayed on a same screen changes, the viewer will feel that the depth of the displayed object also changes.

Figure 6:
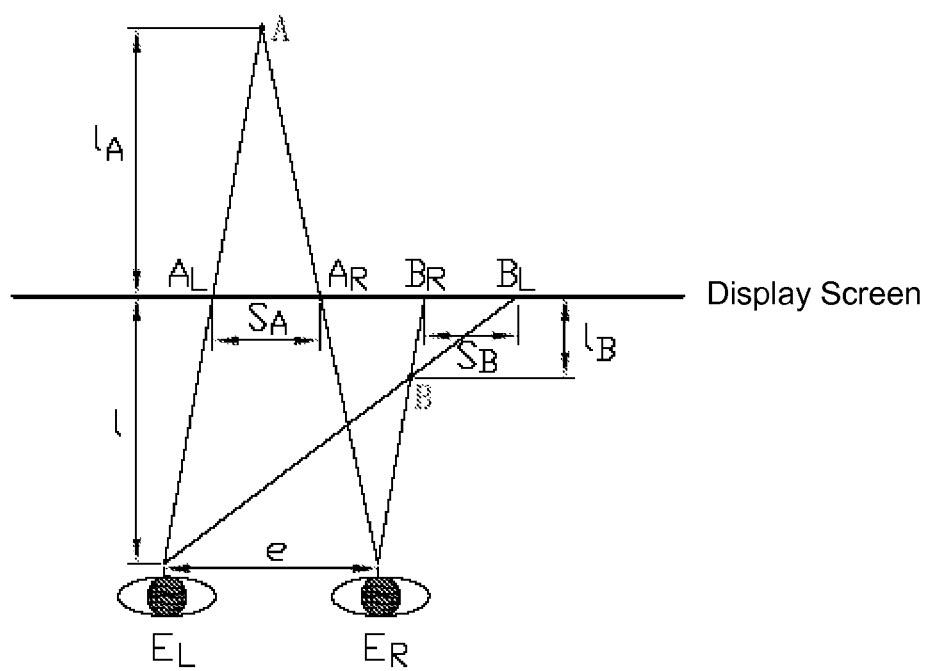
FIG. 6 illustrates 3D depth-changing effects consistent with the disclosed embodiments.

FIG. 6 illustrates 3D depth-changing effects consistent with disclosed embodiments. As shown in FIG. 6, $E_L$ and $E_R$ are a viewer's left eye and right eye, respectively. $A_L$ and $A_R$ are corresponding points of an object point in the first image and the second image, with a first parallax $S_A$ between them, and $B_L$ and $B_R$ are corresponding points of another object point in the first image and the second image, with a second parallax $S_B$ between them. An object point may refer to a point of a target 3D object in the 3D image. Further, A is a virtual image of $A_L$ and $A_R$ observed by the viewer through both eyes, and B is a virtual image of $B_L$ and $B_R$ observed by the viewer through both eyes.

As shown in FIG. 6, virtual image A appears behind the display screen, and thus has a "recessed" effect; while virtual image B appears in front of the display screen, and thus has a "bulge" effect. The degree of "bulge" or "recessed" is the extent of viewer's perception of the depth, which corresponds to the distance from virtual image A or virtual image B to the display screen, denoted as $I_A$ and $I_B$, respectively.

More particularly, for a particular virtual image, the relationship between the perception of depth and the parallax can be represented as:

$$d = \frac{s \times 1}{s - e} \tag{1}$$

where d is the perception of depth, s is the parallax between the two images (e.g., the first image and the second image), l is the distance between the eyes to the display screen, and e is the distance between pupils of the left and right eyes, which is averaged at 65 mm for adults.

Therefore, if any object point corresponding points in the first image and in the second image with a similar arrangement to that of $A_L$ and $A_R$, that is, with a same direction from $A_L$ to $A_R$ as from left eye $E_L$ to right eye $E_R$, then the image of the object point would be behind the display screen. In other words, the object point has a positive parallax, and a viewer has a perception of a negative depth.

On the other hand, if any object point corresponding to points in the first image and in the second image with a similar arrangement to that of $B_L$ and $B_R$, that is, with an opposite direction from $B_L$ to $B_R$ to the direction from left eye $E_L$ to right eye $E_R$, then the image of the object point would be in front of the display screen. In other words, the object point has a negative parallax, and a viewer has a perception of a positive depth.

Figure 7:
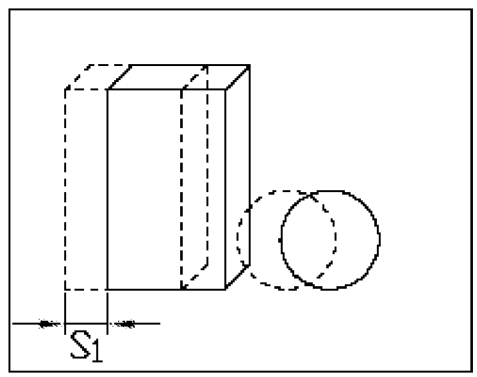
FIG. 7 illustrates an exemplary playback window consistent with the disclosed embodiments.
Figure 8:
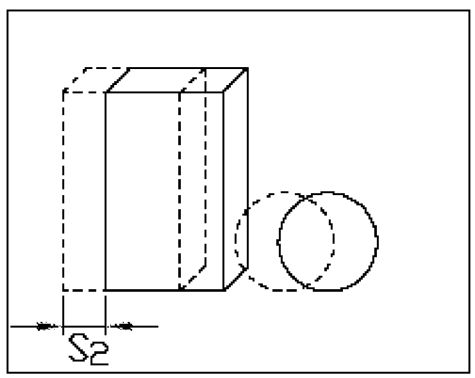
FIG. 8 illustrates another exemplary playback window consistent with the disclosed embodiments.

In video production, a 3D video is often made for a specific 3D display device, e.g., a 3D movie is made for a big screen in a 3D cinema. Thus, during a 3D movie production, the position of video production equipment, camera shooting angle, special scene settings, and other factors can give particular values to parallax among different images from different viewpoints in the 3D video. These values are referred as initial parallax values. When the 3D video later is displayed on 3D display devices other than the big screen for which the 3D video was made, the size of the actual 3D display screen for displaying the 3D video may be different than the desired screen size for the 3D video. This may cause difference between the actual parallax among displayed images of various viewpoints and the desired parallax, i.e., the initial parallax values. Further, if the size of a video playback window changes when playing the 3D video, the actual parallax among displayed images of various viewpoints may also change. FIGS. 7 and 8 illustrate such change consistent with the disclosed embodiments.

FIG. 7 and FIG. 8 show two exemplary windows on a display screen (e.g., display screen 104) with a screen size (resolution) of 1440×900 in pixels. Other screen sizes may also be used. As shown in FIG. 7, a 3D image is displayed on a playback window with a size of 720×450, the parallax $S_1$ between a first image and a second image is $S_1$=41 (pixels). As shown in FIG. 8, the same 3D image is displayed on the playback window with a size of 1080×675 in pixels, the parallax $S_2$ between the first image and the second image is now $S_2=61$ (pixels).

As explained above and in equation (1), changes in parallax among various images from different viewpoints can change a viewer's perception of image depth. When the perceived depth is out of a certain range, ghosting may occur in the displayed 3D images, which may cause dizziness and other undesired viewing experience.

Returning to FIG. 3, to adjust the average parallax value, processor 202 may first determine the actual size of the video playback window and other related information, such as original window or screen size and original average parallax, etc. Further, processor 202 may determine parallax changes for the current playback window, and may adjust the current parallax among various images from different viewpoints by scaling the current parallax among various images. Therefore, the actual parallax among the various images may be kept within a certain range to improve 3D display quality and viewer's viewing experience.

More particularly, provided that a 3D image's original screen size is $R_S$, the initial average parallax is $S_S$, and the current playback window actual size is $R_W$, the average parallax $S_W$ for the current playback window can be represented by:

$$S_W = S_S \times \frac{R_W}{R_S} \qquad (2)$$

Further, processor 202 may determine a desired average parallax $S_r$ for the current playback window size. To adjust the average parallax value to $S_r$, processor 202 may scale the average parallax among various images according to a scaling factor. The scale factor may be represented as:

$$\text{Scale factor} = \frac{R_S}{R_W} \times \frac{S_r}{S_S} \qquad (3)$$

That is, processor 202 may process the various images to create a 3D image with a desired average parallax for a human viewer. New viewpoint positions may be generated based on the scale factor to generate a 3D image with desired average parallax within an acceptable range for the viewer's eyes. Further, it is understood that S2 and S3 are not necessarily performed in sequence, and may be performed independently, separately, or optionally.

After adjusting the average parallax among the various images in the 3D video frame (S3), processor 202 may process or adjust the various images based on a relative position relationship between a viewer and the display screen (S4). Such dynamic adjustment may provide motion parallax among the various images to improve the viewer's real-world sense towards to the 3D images.

Figure 9:
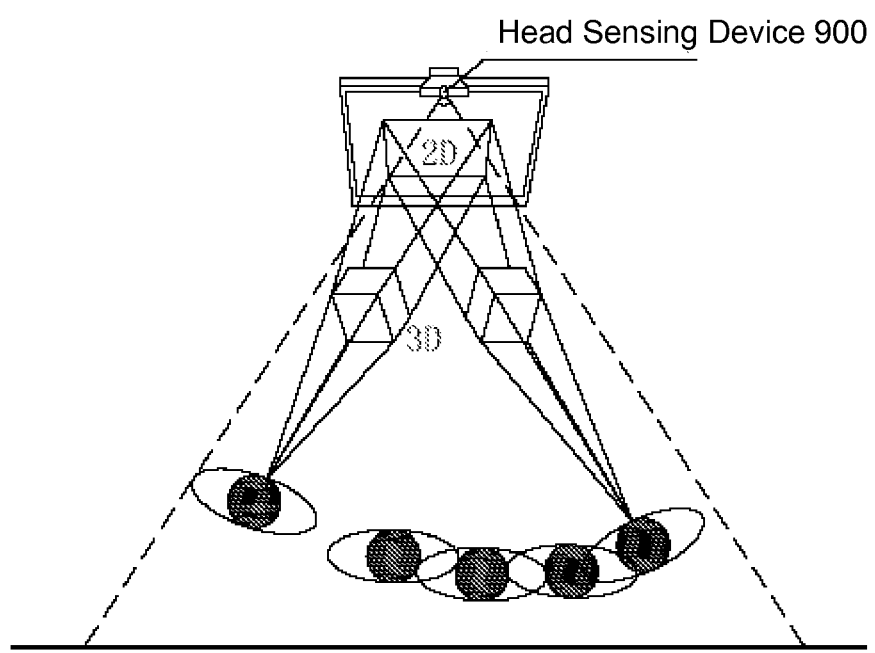
FIG. 9 illustrates an exemplary setting for position tracking consistent with the disclosed embodiments.

FIG. 9 illustrates an exemplary setting for position tracking consistent with the disclosed embodiments. As shown in FIG. 9, a head sensing device 900 may be used to track a viewer's relative position to a display screen. Head sensing device 900 may include any appropriate device capable of detecting a location or position of a viewer's head, such as optical cameras, infrared sensing equipment, ultrasonic equipment, etc.

Based on the location or position information from head sensing device 900, processor 202 may determine a relative position between the viewer's head and the display screen. For example, processor 202 may calculate an offset angle α (not shown) from the viewer's head to the central axis of the display screen. Based on the offset angle α, processor 202 can rearrange the various images from different viewpoints displayed on the display screen, which may be equivalent to adjustments to contents of each image, such as corresponding viewpoint data. The viewer may thus be able to view different 3D images on the display screen at different locations so as to effect a real-world and/or an immersive viewing experience.

In addition, when the 3D video is taken in real-time using certain 3D video capture device, the offset angle α may be used to adjust a shooting position and/or shooting angle such that the viewer can see different contents captured in real-time.

Returning to FIG. 3, processor 202 may also reconstruct 3D scene information based on the original images, and to create a corresponding image for each viewpoint (S5). For example, processor 202 may first reconstruct the 3D scene information (e.g., depth information, dense scenes, etc.) using a 3D matching algorithm. The 3D matching algorithm may include a series of calculations as explained below.

(1) Consistency Cost Calculation

In order to determine a degree of consistency between two points from two images of different viewpoints (e.g., the first image and the second image) and corresponding to the same object point, a consistency cost may be calculated based on pixels. Further, both color and gradient of the points are included in the consistency cost calculation, that is, not only the color consistency, but also the gradient consistency is considered.

For an object point p with corresponding points $A_L$ and $A_R$ in the first image and the second image, the color and gradient difference between $A_L$ and $A_R$ is denoted as $w(A_L, A_R)$, which may be represented as:

$$w(A_L, A_R) = w_c \times \|\text{color}(A_L) | \text{color}(A_R)\| + w_g \times \|\text{Grad}(A_L) | \text{Grad}(A_R)\| \qquad (4)$$

Further, the normalized difference can be represented as:

$$w'(A_L, A_R) = \sqrt{\frac{w(A_L, A_R)}{\sigma(A_L)\sigma(A_R)}} \qquad (5)$$

Thus, the consistency cost can be represented as:

$$C(p) = (w'(A_L, A_R))^e \qquad (6)$$

(2) Continuity Calculation

In order to have neighboring points of the object point p keep the same color and gradient, a continuity calculation is also performed. For example, for a neighboring point $p_N$, the continuity between the two points $p_N$ and p is:

$$V(p, p_N) = \min(|(pA_L - pA_R) - (p_N A_L - p_N A_R)|, \delta)^e \qquad (7)$$

where δ is a predetermined consistency threshold.

(3) Energy Function Calculation

Based on the consistency cost calculation and the continuity calculation, an energy function can be calculated to obtain an energy function value of the 3D image. The energy function can be represented as:

$$E = \sum_p c(p) + \lambda \sum_p \sum_{p_N} v(p, p_N) \qquad (8)$$

where μ is a predetermined contribution factor for continuity.

Further, by minimize the energy function, a pair of matching points from the first image and the second image, i.e., the matching points, may be found. After the matching points were found, a distance between these two matching points can be determined. Therefore, the parallax of point p between the first image and the second image can also be determined. Further, a table of matching relationships between the first image and the second image may be established.

(4) Blockage Processing

After establishing the matching relationship table, blockage processing may need to be performed on the first and second images. For example, from the matching relationship table, processor 202 may find points in the first and second images that are not matched and may mark those unmatched points to create a new matching relationship table. Because any non-blocked point would have matched points in the first image and second image, respectively, while a blocked point does not have such matching points, blockage processing may be performed based on the new matching relationship table marked with matched and unmatched points.

The matching relationship table may thus reflect the original 3D scenes and other information (i.e., a reconstruction of the original 3D scene information). Further, processor 202 may generate new viewpoints based on above calculated parameters and information, such as the scale factor and the offset angle α, etc. FIGS. 10A, 10B, 11A, and 11B illustrate exemplary new viewpoints generation consistent with the disclosed embodiments.

As shown in FIG. 10A, an initial 3D image has two viewpoints V1 and V2, and the distance between two viewpoints is Sa. As shown in FIG. 10B, four (4) additional auxiliary viewpoints are created such that a total of six (6) viewpoints, V1, V2, V3, V4, V5, and V6, are used. The distance between two viewpoints now becomes Sb, which is different from Sa. Therefore, a scale factor of (Sb/Sa) is used to create new viewpoint positions and new distance between viewpoints.

As shown in FIG. 11A, a total of six viewpoints, V1, V2, V3, V4, V5, and V6, are used with a view center O, and no motion parallax is considered. As shown in FIG. 11B, a new offset angle α may be obtained by head sensing device 900. A new view center O' may thus be calculated based on the offset angle α. Processor 202 may also rearrange the six viewpoints with respect to the new center O', which results in shifting of all view points' position horizontally.

After generating the new viewpoints, processor 202 may also create an image for each viewpoint (S5). For example, processor 202 may create images using a traditional camera projection matrix or using a shifting interpolation approach. Other methods may also be used.

Figure 12:
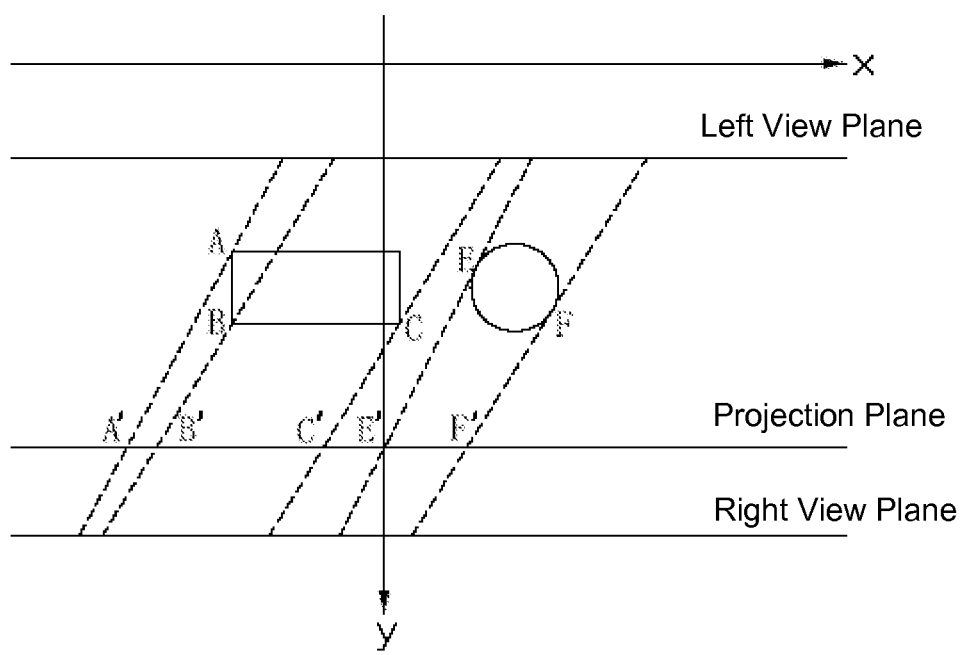
FIG. 12 shows an exemplary shifting interpolation approach consistent with the disclosed embodiments.

FIG. 12 shows an exemplary shifting interpolation approach consistent with the disclosed embodiments. As shown in FIG. 12, a stereo format is used for the 3D images, and a left viewpoint and a right viewpoint are the initial viewpoints. The dotted lines indicate a matching relationship between the first image (the left view) and the second image (the right view). That is, object points A, B, C, E, and F correspond to the matching points respectively on the left view projection plane and the right view projection plane (i.e., intersection points between the dotted lines and the left and right view projection planes, which are not denoted).

Thus, to create a new viewpoint, a corresponding projection plane is determined based on distances among viewpoints. The object points A, B, C, E, and F may be shifted horizontally and projected on the projection plane to generate new image points for the new viewpoint as A', B', C', E', and F', or as the intersection points between the dotted lines and the projection plane. By the same calculation for all object points, an entire new image can be created. That is, based on the matching relationship between the first and second images, new images corresponding to new viewpoints can be created through interpolation.

Further, processor 202 may combine the various images corresponding to all viewpoints to generate 3D images and send the 3D images to a 3D display device for 3D display (S6). For example, processor 202 may combine the various images using certain pixel arrangement algorithms. Other combination methods may also be used.

By dynamically adjusting parallax and other viewpoint related information and creating additional viewpoints and corresponding images, the disclosed systems and methods may provide desired display compatibility and display quality.

What is claimed is:

1. A method for a three-dimensional (3D) display system, comprising:
 obtaining a plurality of original images of a plurality of viewpoints in a 3D image for display;
 adjusting an average parallax value between at least two of the plurality of original images based on a current size of a display window on a display device configured to display the 3D image;
 reconstructing 3D scene information of the 3D image using a 3D matching algorithm based on consistency cost calculation, continuity calculation, energy function calculation, and blockage processing on the original images;
 obtaining an image for each of the plurality of viewpoints and at least one new viewpoint based on the reconstructed 3D scene information;
 combining the image of each viewpoint into a new 3D image with a desired average parallax; and
 sending the new 3D image to the display device for 3D display.

2. The method according to claim 1, further including:
 determining a total number of required images based on a type of the display device;
 determining whether the total number of required images is equal to a total number of the plurality of original images;
 when the total number of required images is not equal to the total number of the plurality of original images, adjusting the plurality of original images such that the total number of required images is provided.

3. The method according to claim 1, wherein adjusting the average parallax value further includes:
 calculating a scale factor between at least two original images based on the current size of the display window; and
 adjusting the average parallax value based on the scale factor.

4. The method according to claim 3, wherein calculating the scale factor further includes:
 provided that $R_S$ is an original screen size of the 3D image, $S_S$ is an initial average parallax of the 3D image, $R_W$ is the current size of the display window, and $S_r$ is a desired average parallax of the new 3D image, calculating the scale factor as:

$$\text{Scale factor} = \frac{R_S}{R_W} \times \frac{S_r}{S_S}.$$

5. The method according to claim 1, further including:
 determining a relative position between a viewer's head and the display device; and rearranging the plurality of original images based on the relative position between the viewer's head and the display device.

6. The method according to claim 5, wherein determining the relative position further includes:
   detecting a position of the viewer's head using a head sensing device in real-time; and
   calculating an offset angle from the viewer's head to a central axis of the display device to indicate the relative position.

7. The method according to claim 1, wherein reconstructing 3D scene information of the 3D image further includes:
   obtaining the 3D scene information using at least two of the original images of two original viewpoints;
   adding at least one new viewpoint to the two original viewpoints;
   creating an image for the new viewpoint using an interpolation based on the 3D scene information and distances between the new viewpoint and two original viewpoints, respectively.

8. The method according to claim 7, wherein obtaining the 3D scene information further includes:
   establishing a matching relationship table indicating 3D scene information by minimizing an energy function between points in the at least two of the original images.

9. A three-dimensional (3D) display system, comprising:
   a display device containing a display window for displaying images; and
   a processor configured to:
      obtain a plurality of original images of a plurality of viewpoints in a 3D image for display;
      adjust an average parallax value between at least two of the plurality of original images based on a current size of the display window;
      reconstruct 3D scene information of the 3D image using a 3D matching algorithm based on consistency cost calculation, continuity calculation, energy function calculation, and blockage processing on the original images;
      obtain an image for each of the plurality of viewpoints and at least one new viewpoint based on the reconstructed 3D scene information;
      combine the image of each viewpoint into a new 3D image with a desired average parallax; and
      send the new 3D image to the display device for 3D display.

10. The 3D display system according to claim 9, wherein the processor is further configured to:
   determine a total number of required images based on a type of the display device;
   determine whether the total number of required images is equal to a total number of the plurality of original images;
   when the total number of required images is not equal to the total number of the plurality of original images, adjust the plurality of original images such that the total number of required images is provided.

11. The 3D display system according to claim 9, wherein, to adjust the average parallax value, the processor is further configured to:
   calculate a scale factor between the at least two original images based on the current size of the display window; and
   adjust the average parallax value based on the scale factor.

12. The 3D display system according to claim 11, wherein, to calculate the scale factor, the processor is further configured to:

provided that $R_S$ is an original screen size of the 3D image, $S_s$ is an initial average parallax of the 3D image, $R_W$ is the current size of the display window, and $S_r$ is a desired average parallax of the new 3D image, calculate the scale factor as:

$$\text{Scale factor} = \frac{R_S}{R_W} \times \frac{S_r}{S_S}.$$

13. The 3D display system according to claim 9, the processor is further configured to:
   determine a relative position between a viewer's head and the display device; and
   rearrange the plurality of original images based on the relative position between the viewer's head and the display device.

14. The 3D display system according to claim 13, wherein, to determine the relative position, the processor is further configured to:
   detect a position of the viewer's head using a head sensing device in real-time; and
   calculate an offset angle from the viewer's head to a central axis of the display device to indicate the relative position.

15. The 3D display system according to claim 9, wherein, to reconstruct the 3D scene information, the processor is further configured to:
   obtain the 3D scene information using at least two of the original images of two original viewpoints;
   add at least one new viewpoint to the two original viewpoints;
   create an image for the new viewpoint using an interpolation based on the 3D scene information and distances between the new viewpoint and two original viewpoints, respectively.

16. The 3D display system according to claim 15, wherein, to obtain the 3D scene information, the processor is further configured to:
   establish a matching relationship table indicating 3D scene information by minimizing an energy function between points in the at least two of the original images.

17. A non-transitory computer readable medium containing executable computer instructions for performing a method for a three-dimensional (3D) display system, the method comprising:
   obtaining a plurality of original images of a plurality of viewpoints in a 3D image for display;
   adjusting an average parallax value between at least two of the plurality of original images based on a current size of a display window on a display device configured to display the 3D image;
   reconstructing 3D scene information of the 3D image using a 3D matching algorithm based on consistency cost calculation, continuity calculation, energy function calculation, and blockage processing on the original images;
   obtaining an image for each of the plurality of viewpoints and at least one new viewpoint based on the reconstructed 3D scene information;
   combining the image of each viewpoint into a new 3D image with a desired average parallax; and
   sending the new 3D image to the display device for 3D display.

18. The non-transitory computer readable medium according to claim 17, wherein adjusting the average parallax value further includes:

calculating a scale factor between the at least two original images based on the current size of the display window; and adjusting the average parallax value based on the scale factor.

19. The non-transitory computer readable medium according to claim 18, wherein calculating the scale factor further includes:

provided that $R_S$ is an original screen size of the 3D image, $S_s$ is an initial average parallax of the 3D image, $R_W$ is the current size of the display window, and $S_r$ is a desired average parallax of the new 3D image, calculating the scale factor as:

$$\text{Scale factor} = \frac{R_S}{R_W} \times \frac{S_r}{S_S}.$$

20. The non-transitory computer readable medium according to claim 17, wherein reconstructing 3D scene information of the 3D image further includes:

obtaining the 3D scene information using at least two of the original images of two original viewpoints;

adding at least one new viewpoint to the two original viewpoints;

creating an image for the new viewpoint using an interpolation based on the 3D scene information and distances between the new viewpoint and two original viewpoints, respectively.

* * * * *